Sept. 27, 1966   P. B. McCRACKEN   3,274,938
CONTROL APPARATUS FOR ADJUSTING PRESSURE-FLOW
CHARACTERISTIC OF A PUMP
Filed Oct. 11, 1963                  2 Sheets-Sheet 1

INVENTOR.
PAUL B. McCRACKEN
BY
Mellin and Hanscom
ATTORNEYS

Sept. 27, 1966 P. B. McCRACKEN 3,274,938
CONTROL APPARATUS FOR ADJUSTING PRESSURE-FLOW
CHARACTERISTIC OF A PUMP
Filed Oct. 11, 1963 2 Sheets-Sheet 2

INVENTOR.
PAUL B. McCRACKEN
BY
Mellin and Hanscom
ATTORNEYS

United States Patent Office 3,274,938
Patented Sept. 27, 1966

3,274,938
CONTROL APPARATUS FOR ADJUSTING PRESSURE-FLOW CHARACTERISTIC OF A PUMP
Paul B. McCracken, El Cerrito, Calif., assignor to Berkeley Pump Company, Berkeley, Calif., a corporation of California
Filed Oct. 11, 1963, Ser. No. 315,502
6 Claims. (Cl. 103—11)

This invention relates to pumping systems and related apparatus, and, more particularly, to a system for adjusting the pressure-flow characteristic of a vertical turbine pump to produce a desired flow output or maintain a given discharge pressure.

Many water supply systems must be capable of delivering water at a widely variable flow rate demand while maintaining a reasonably constant line pressure. The familiar elevated tank has long been used to provide a substantially uniform hydrostatic head for water distribution systems of this kind. However, the high initial cost of such tanks, as well as maintenance costs, is a disadvantage to their being used. In addition, current esthetic trends indicate that the elevated tank is undesirable. For these reasons, many water supply systems have been developed to provide so-called "tankless" pipe distribution systems, which utilize centrifugal pumps having a characteristic that the pressure developed decreases as the flow rate increases. A pressure reduction, however, is undesirable in many water supply systems, and for this reason various devices have been applied to the centrifugal pumps in order to achieve a constant pressure characteristic under variable flow conditions.

At present, two different approaches have been taken to achieve constant pipe pressure. One approach employs an centrifugal pump capable of delivering excessive pressure as compared with that which might be required to supply water to a given system. The high pressure of the pump is then reduced to the desired line pressure by means of pressure regulating valves. Such control systems, however, have the following disadvantages: First, an oversize pump and driver is needed to produce the maximum flow rate required, since a pressure exceeding the maximum line pressure is necessary to overcome the pressure drop through the throttling device. This means that the initial cost of the pump and motor will be higher than necessary if no throttling device were used. (Also the cost of maintenance and operation of a larger pump and motor will be greater.) Secondly, since a throttling of fluid results in an energy loss, the system can never achieve the best efficiency of the pump even at optimum flow conditions.

A second approach to the problem of maintaining a substantially uniform line pressure has been to change the pressure-flow characteristics of the centrifugal pump by varying pump speed. This may be done by connecting the pump to a constant speed motor through a variable slip transmission. Alternatively, the pump may be driven with a variable slip electric motor. Both of these variable slip drive systems suffer from their inability to achieve the full design speed of an induction motor, and the size of the pump must, therefore, be increased to compensate for the lower speeds obtainable. The high initial cost of purchasing these systems (resulting from required use of oversize components and heat dissipation equipment), the high maintenance costs, and the high operating costs (which may be attributed to energy losses) are justified only by the lack of a less expensive system to choose from.

In brief, the present invention involves a new system for operating a vertical turbine pump with a variable flow rate but a system having none of the throttling and heat losses which occur in the conventional system described. Moreover, the apparatus employed by the invention does not require an oversize in either the pump or its drive motor to attain various types of operating performances. This invention more particularly involves the use of a hydraulic lifting cylinder for adjusting the position of the pump shaft and impeller assembly of a conventional pump to allow a certain amount of port-to-port recirculation of water across the impeller vane faces. Since the pressure-flow characteristic of the pump will depend upon the proximity of the impeller faces relative to the pump bowls in which they rotate, an adjustment in the clearance between surfaces of the impeller and pump bowl will effect a change in the pump's pressure-flow characteristic. The hydraulic lifting cylinder may be placed under the control of means responsive to some condition governing the pump's operation. It is particularly contemplated that a control means be employed for adjusting the pump's pressure-flow characteristic in response to the line pressure of the pump's discharge. Alternatively, the control means may be conditioned to respond to the velocity of discharge from the pump or to the liquid level in a reservoir or a sump.

Various objects of this invention will become apparent in view of the following description and the accompanying drawings.

In the drawings forming a part of this application and in which like parts are designated by like reference numerals throughout the same, FIG. 1 illustrates one embodiment of this invention in a pumping system for controlling the discharge line pressure of a vertical turbine pump;

Figures 1, 2:
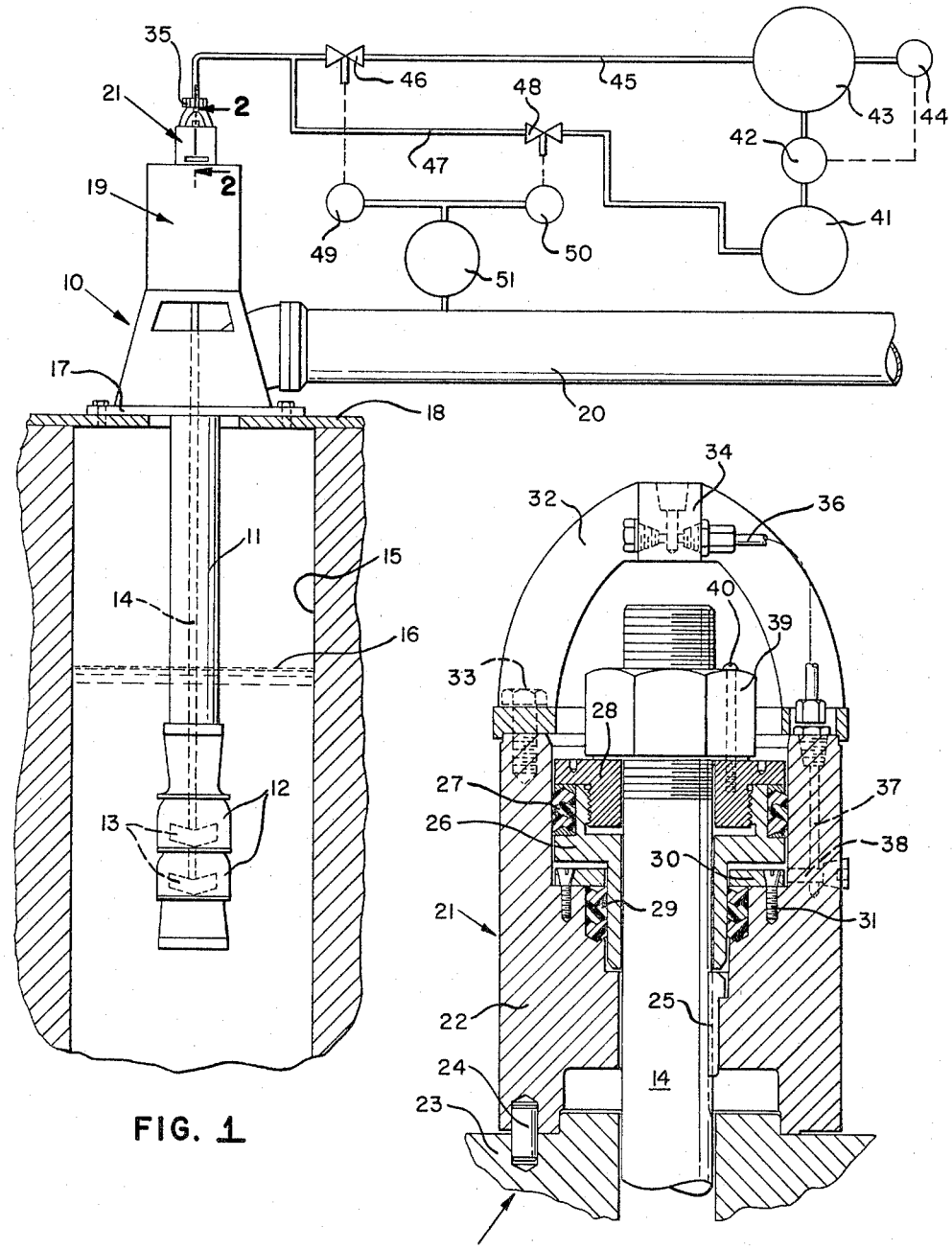
FIG. 2 is a section of the lifting cylinder forming a part of the apparatus shown in FIG. 1 and taken on lines 2—2 thereof.

Referring to FIG. 1 of the drawings, there is shown a vertical turbine pump 10 comprising a pump housing 11 including pump bowls 12. Turbine pump 10 also includes semi-open impellers 13 mounted within bowls 12 on the lower end of a pump shaft 14. As illustrated, the pump is disposed in operative relationship to a sump or well 15 having a water level 16 therein. Pump housing 11 is supported from a flange plate 17 secured to a foundation 18. In a conventional manner, pump shaft 14 is driven by a constant speed, vertical hollow shaft motor 19 which receives the upper end of pump shaft 14 therethrough. As impellers 13 are rotated, fluid is pumped from well 15 and discharged into a pump discharge line 20.

The foregoing description of apparatus may be regarded as conventional, since the invention more particularly relates to the manner in which the pump shaft 14 is supported and adapted to be moved as to place impellers 13 in varied relationship and with various clearances between their vanes and the inner surface of pump bowls 12.

It is known that the pressure-flow characteristic of semi-open impeller pumps depends upon the proximity of the impeller vane faces to the inner surfaces of the pump bowl in which they rotate. The flow rate against a fixed pressure is characteristically at its highest when the impeller vane faces are closest to the pump bowl surfaces. Some clearance, however, is necessary to avoid metal-to-metal contact, and for this purpose a clearance of 0.005 inch may be sufficient. But as the clearance or spacing becomes greater, the pump's flow rate against a fixed pressure will decrease, since there will be an increased port-to-port recirculation within the impeller. Assuming that the impeller is rotated at substantially uniform speeds, an increase in impeller vane to pump bowl spacing will result in corresponding decreases in either pump flow against a fixed pressure or pump pressure at a constant flow, depending on which parameter is to be maintained constant. This principle of pump operation is utilized with the apparatus shown, and by lifting the impellers 13 away from bowls 12 (or placing them closer thereto) the pump's pressure-flow characteristic may be selectively controlled to obtain flow rates between normal pump capacity and fifty percent of its normal capacity without suffering from throttling losses, heat dissipation losses, or oversize requirements of conventional constant pressure-variable flow systems.

Referring to FIG. 2 in particular, pump shaft 14 is supported from the upper end of motor 19 by a hydraulic lifting ram 21. The ram comprises a housing 22 that is pinned to vertical hollow shaft or quill 23 by a detent 24 and is keyed to shaft 14 by a key 25. Ram 21 also comprises a tubular piston 26 having a chevron packing member 27 confined in a peripheral recess of the piston by a threaded sleeve 28 which connects to said piston. A lower chevron packing member 29 is disposed in the inner recess of housing 22 and held in place by a ring 30 secured to the housing by screws 31.

A head frame 32 bolted to housing 22 by cap screws 33 provides a fluid coupling 34 that is adapted for receiving the threaded end of a conventional swivel coupling 35, shown in FIG. 1. One suitable type of fitting is manufactured by Eaton Manufacturing Co. of Cleveland, Ohio. A tubular conduit 36 interconnects coupling 34 with a drilled passageway 37 formed in housing 22, said passageway interconnecting at right angles with a lead passageway 38. It will be seen that fluid may be introduced into housing 22 through the coupling 34, conduit 36, passages 37 and 38 to underside of tubular piston 26. Chevron packings 27 and 29 retain the fluid within the ram housing 22 supporting the tubular piston 26 and sleeve 28 on the fluid within the ram chamber.

Pump shaft 14, it will be seen, is supported from tubular piston 26 and threaded sleeve 28 by a nut 39 threaded to the upper end of said shaft. Nut 39 is locked to sleeve 28 in a position of adjustment along shaft 14 by a screw 40, but its position of adjustment of shaft 14 may be varied independently of the position of tubular piston 26 as to raise or lower shaft 14 and impellers 13. At the time of initial installation, nut 39 is turned down until shaft 14 is supported from tubular piston 26 with the piston being supported on housing 22 rather than any fluid within the housing. Shaft 14 should then be lifted by further rotation of nut 39 a sufficient distance to place the impellers a minimum permissible clearance from the surfaces of the bowls.

Referring again to FIG. 1, a control system is provided for selectively admitting and removing hydraulic fluid from the lifting cylinder 21. The system shown comprises a hydraulic oil reservoir 41 from which a pump 42 receives an oil supply and discharges it into an accumulator 43. The operation of pump 42 is under the control of a pressure responsive switch 44 which senses the pressure and the level of fluid in accumulator 43. A feed line 45 having a valve 46 therein is adapted for discharging fluid through swivel coupling 35 and forcing the fluid into hydraulic lifting cylinder 21. A return line 47 connects with line 45 on the low pressure side of valve 46. The return line is provided with a valve 48 which when open allows fluid to pass from the lifting cylinder 21 back through the coupling 35, line 47, and into reservoir 41.

Valves 46 and 48 are respectively controlled by pressure sensing switches 49 and 50. Both switches fluidly communicate with a surge chamber 51 connected to discharge line 20. Switches 49 and 50 may be of any conventional design such as those having a mechanical operating member for actuating a valve with abrupt movement. Switches 49 and 50 may also be of the type used for energizing an electric circuit and operating a solenoid, which in turn operates valves 46 and 48, respectively.

Pressure sensitive switch 49 which controls the admission of hydraulic fluid through valve 46 is set to close at a pressure slightly higher than the required line pressure. Switch 50, on the other hand, is set to close at a pressure slightly lower than the required line pressure, so that hydraulic fluid is allowed to bleed from ram 21 through valve 48 when the pressure and discharge line 20 is abnormally low.

In operation, the system disclosed is adapted for maintaining a uniform discharge pressure in pipeline 20 even though the fluid demands in the pipeline may be considerably varied. If pump 10 is capable of delivering enough fluid to maintain a pressure in discharge line 20 between the settings of switches 49 and 50, valves 46 and 48 will be closed and the system will be in equilibrium. It will be understood, however, that if the flow rate demand on the pipeline should increase there will be an associated decrease in line pressure. When the pressure has been lowered to the setting of switch 50, the switch will close causing the outlet valve 48 to open, thereby allowing hydraulic fluid to be drained from shaft lifting cylinder 21. As hydraulic oil flows out of the shaft lifting cylinder, piston 26 will tend to settle downward, lowering pump shaft 14 and decreasing the clearance between the surfaces of rotating impellers 13 and the surfaces of pump bowls 12. In this manner, the port-to-port recirculation is reduced with a corresponding increase in flow rate and pressure. When the proper operating position of the impellers has been attained, as indicated by the new adjusted flow rate and a recovery of pipeline pressure, pressure switch 50 will close valve 48. The vertical turbine pump will now stabilize at the new operating position until a readjustment of flow rate is again indicated by a change of pipeline pressure.

It will be noted that a lowering of tubular piston 26 which places its end into contact with housing 21 serves as a positive stop to prevent the impellers from contacting pump bowl 13, particularly in the event the line pressure should continue to fall. As previously described, the minimum clearance necessary to avoid contact is initially set by operation of the nut 39 at a time the tubular piston 26 rests upon housing 22. With continued use there will, of course, be a wearing of both impeller and pump bowl surfaces. This will tend to increase the amount of clearance originally provided between the surfaces, but the clearance may be adjusted, if necessary, by removing cap screw 40 and threading nut 39 closer to the end of shaft 14. However, it will be evident that the amount of clearance provided is of no importance to the operation of the system, which is self-adjusting to meet conditions of ordinary wear.

If the flow rate demand on pipe line 20 should be crease there will be an associated increase in line pressure. When the pressure increases to the setting of switch 49, valve 46 will be opened. Hydraulic fluid will now be forced into hydraulic lifting cylinder 21 from the accumulator 43, thereby lifting pump shaft 14 and increasing the face clearance between the semi-open impellers and the pump bowls. As a result, there will be an increase in port-to-port recirculation. There will also be a corresponding decrease in the flow rate from the vertical turbine pump at a lower pump pressure. When the flow rate has been lowered and is matched to the demand of the system, switch 49 will close valve 46, thereby stabilizing pump 10 at its new operating position.

Under certain circumstances, it is essential that the pump discharge be held to a predetermined maximum which is not to be exceeded. For example, where a pump supplies fluid to a reservoir, it may be necessary to limit the pump's output to avoid flooding the reservoir, which would waste fluid and may cause damage.

Figure 3:
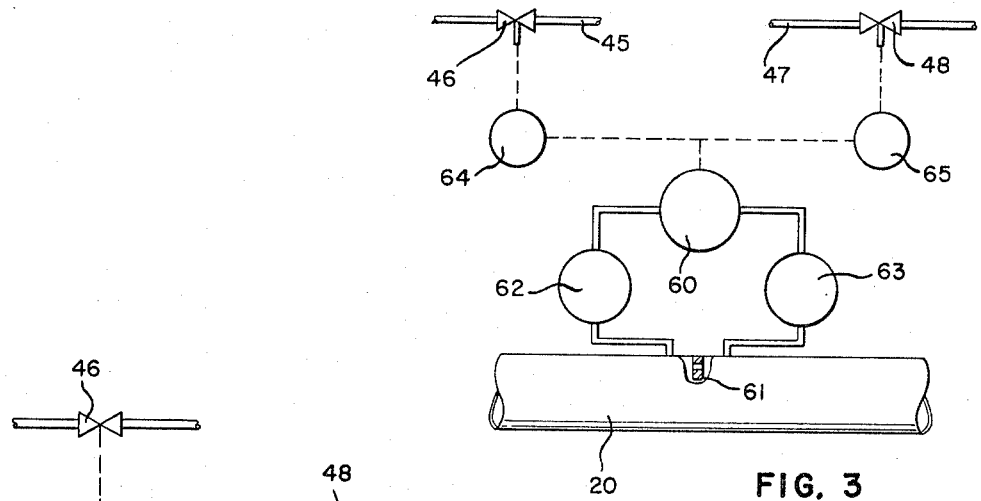
FIG. 3 illustrates a portion of a second embodiment of this invention in a pumping system where the pumping system is controlled by the velocity of the discharged fluid.

Referring to FIG. 3, there is shown a modified form of control system capable of adjusting the vertical turbine pump 10 in response to the velocity of pump discharge. This system will maintain substantial uniformity in the rate at which fluid is pumped through discharge line 20 irrespective of the pressure in that line. This system may, therefore, be used where it is desired that the pump operate at maximum efficiency so long as the velocity of discharge does not exceed a predetermined maximum. The system shown in FIG. 3 comprises a velocity gauge 60 having pressure inputs from the opposite sides of a sharp-edged orifice plate 61 disposed in discharge line 20. The pressures are measured from surge tanks 62 and 63. Velocity gauge 60 may be of any conventional type which provides an output signal that reflects the velocity within discharge line 21. The output signal is fed to a high velocity control switch 64 and a low velocity control switch 65, and each of the switches operates valves 46 and 48, respectively, in the hydraulic system shown in FIG. 1 as previously described. Where the output from the velocity gauge 60 is transmitted as gas pressure, switches 64 and 65 become identical with switches 49 and 50, as shown in FIG. 1.

It will be readily apparent that if the velocity within the discharge pipe 21 tends to exceed a predetermined maximum, switch 64 will operate valve 46 to open, thereby lifting pump shaft 14 and impellers 13. There will then be a corresponding decrease in the pump output until the velocity of fluid flow through line 20 returns to normal. The velocity of discharge through line 20 is, however, maintained by the low velocity sensitive switch 65. Thus, while a wearing of either pump bowl surfaces or impellers 13 may tend to reduce the efficiency of the pumping apparatus, and thereby decrease the velocity of fluid flow, switch 65 will control the operation of valve 48 to lower pump shaft 14 and place impellers 13 closer to the surfaces of pump bowls 12.

Figure 4:
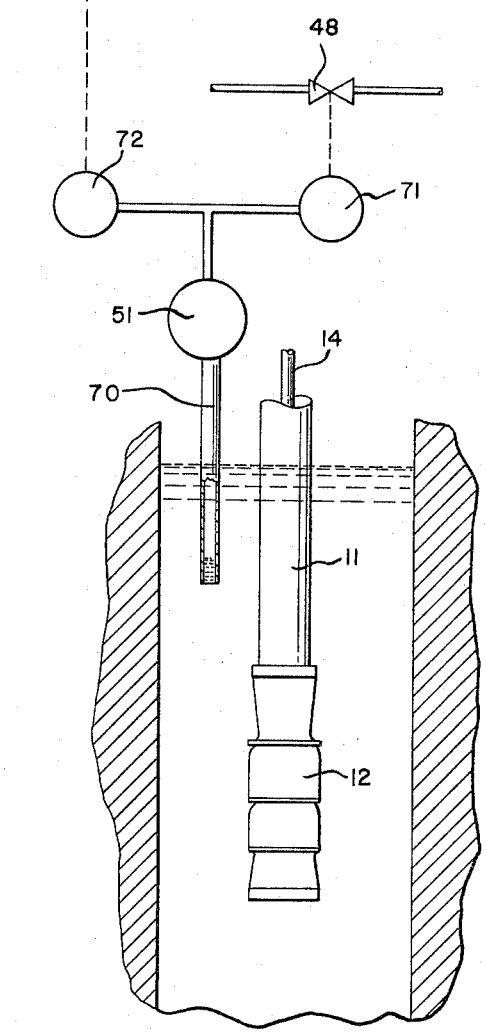
FIG. 4 is a portion of yet another embodiment illustrating control apparatus for adjusting the pump's pressure-flow characteristic in response to the liquid level of a sump or reservoir.

FIG. 4. illustrates another use of the apparatus shown in FIG. 1 for controlling the efficiency of the pumping apparatus. In certain applications, it is necessary that either a minimum or a maximum liquid level be maintained in a sump from which fluid is being withdrawn. In particular, it may be necessary to keep a pump primed by slowing down the rate of fluid discharged from a pump, or to prevent flooding of a sump it may be advisable to increase the rate of discharge. An automatic operation of this type and character is derived merely by sensing the liquid level within the sump, connecting surge tank 51 (of the system described in connection with FIG. 1) to a gas-filled tube 70. The lower end of tube 70 is positioned beneath the lower limit of a permissible liquid level so that the gas within the tube is held under hydrostatic pressure. A rise in the fluid level in the sump will produce a greater hydrostatic pressure, and if this pressure exceeds the predetermined maximum as determined by a high pressure switch 71, valve 48 will be opened, lowering pump shaft 14 and impellers 13 and increasing the flow rate of pump 10. Control over the pumping system is also provided by a low pressure responsive switch 72 which operates valve 46 to open in the event that the fluid level within the reservoir is below a predetermined lower limit.

It has already been indicated that normal wearing of impeller and pump bowl surfaces will not impair the effectiveness of any control system described. Moreover, the fact that pump efficiency may be a non-linear function of the clearance between impellers and pump bowls presents no difficulty in operating any of the control systems. Progressive wearing of the impellers or pump bowl surfaces will, of course, affect the greatest possible efficiency of the pump, but this efficiency or capacity may be periodically regulated, if necessary, by manual operation of adjusting nut 39 as to lower pump shaft 14 and place impellers 13 closer to the pump bowl surfaces.

It is to be understood that although preferred embodiments of this invention have been shown and described, various changes may be made in the apparatus and systems without departing from the spirit of the invention or the scope of the attached claims, and each of such changes is contemplated.

What I claim and desire to secure by Letters Patent is:

1. In combination, a turbine type pump having an impeller disposed within a pump bowl housing, means for rotating said impeller at a substantially constant speed, actuating means for moving said impeller axially of said pump bowl housing to vary the clearance between surfaces and change the pressure-flow characteristic of said pump, and control means responsive to predetermined operating conditions for energizing said actuating means and adjusting said clearance, said actuating means comprising a hydraulic cylinder, a source of hydraulic fluid, a high pressure line for conducting fluid to said cylinder from said source of fluid, a low pressure line for conducting fluid from said cylinder to said source of fluid, a first control valve disposed in said high pressure line, and a second valve disposed in said high pressure line, and a second control valve in said low pressure line, said control means being adapted for selectively opening and closing said first and second control valves.

2. The combination of claim 1 wherein said high pressure line includes a hydraulic pressure pump and an accumulator, and further comprising a control means responsive to pressure in said accumulator for energizing said hydraulic pressure pump.

3. The combination of claim 1 wherein said control means comprises a pair of pressure responsive switches for opening and closing said first and second valves, respectively.

4. The combination of claim 3 wherein each of said pair of pressure responsive switches fluidly communicates with the pump discharge line.

5. In combination, a vertical turbine pump having an impeller mounted on a vertically disposed pump shaft, and a pump housing including an impeller pump bowl, means including a hydraulic lifting cylinder having a tubular piston for supporting said pump shaft relative to said housing, said pump shaft extending through said piston and supported therefrom by a vertically adjustable stop, means for rotating said pump shaft and lifting cylinder at a substantially constant speed relative to said pump housing; means for selectively admitting a source of hydraulic fluid under pressure into said lifting cylinder, and means for removing hydraulic fluid from said lifting cylinder, said means for selectively admitting and removing hydraulic fluid into and from said lifting cylinder comprising a source of hydraulic fluid, a high pressure line for conducting fluid to said cylinder from said source of fluid, a low pressure line for conducting fluid from said cylinder to said source of fluid, a first control valve disposed in said high pressure line, and a second control valve disposed in said low pressure line.

6. The combination of claim 5 wherein said high pressure line includes a hydraulic pressure pump and an accumulator, and further comprising a control means responsive to pressure in said accumulator for energizing said hydraulic pressure pump.

(References on following page)

References Cited by the Examiner

UNITED STATES PATENTS

| | | | |
|---|---|---|---|
| 1,756,326 | 4/1930 | Wintroath | 103—102 |
| 1,813,747 | 7/1931 | Kirgan | 103—97 |
| 1,814,538 | 7/1931 | Wintroath | 103—102 |
| 2,224,295 | 12/1940 | Hafer | 103—11 |
| 2,786,420 | 3/1957 | Kenney | 103—97 |
| 2,874,642 | 2/1959 | Forrest | 103—103 |
| 2,878,785 | 3/1959 | Rexford | 91—433 |
| 3,010,402 | 11/1961 | King | 103—97 |
| 3,048,384 | 8/1962 | Sweeney et al. | 103—97 |

FOREIGN PATENTS

| | | |
|---|---|---|
| 808,796 | 3/1951 | Germany. |

MARK NEWMAN, *Primary Examiner.*

DONLEY J. STOCKING, SAMUEL LEVINE,
*Examiners.*

W. L. FREEH, *Assistant Examiner.*